Oct. 15, 1946.    J. BOLSEY    2,409,605
PHOTOGRAPHIC CAMERA
Filed Oct. 18, 1943    5 Sheets-Sheet 1
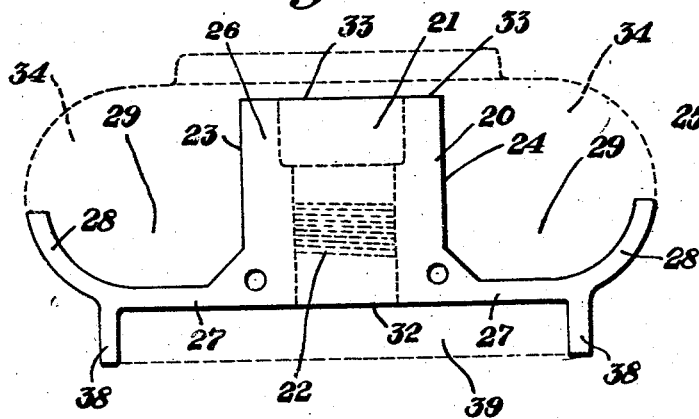
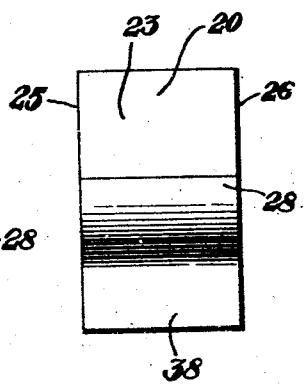
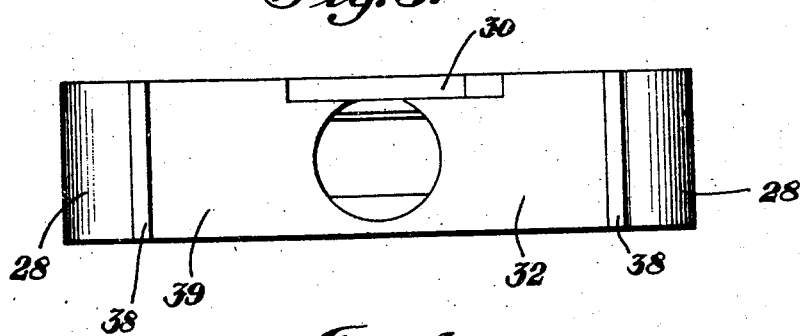
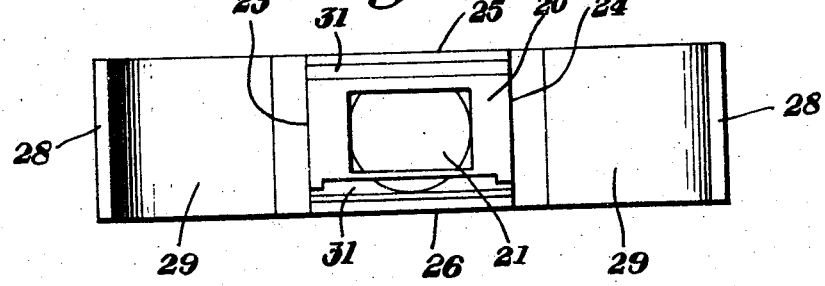
INVENTOR.
JACQUES BOLSEY Oct. 15, 1946.   J. BOLSEY   2,409,605
PHOTOGRAPHIC CAMERA
Filed Oct. 18, 1943   5 Sheets-Sheet 2

INVENTOR.
JACQUES BOLSEY
BY

Oct. 15, 1946.   J. BOLSEY   2,409,605
PHOTOGRAPHIC CAMERA
Filed Oct. 18, 1943   5 Sheets-Sheet 3
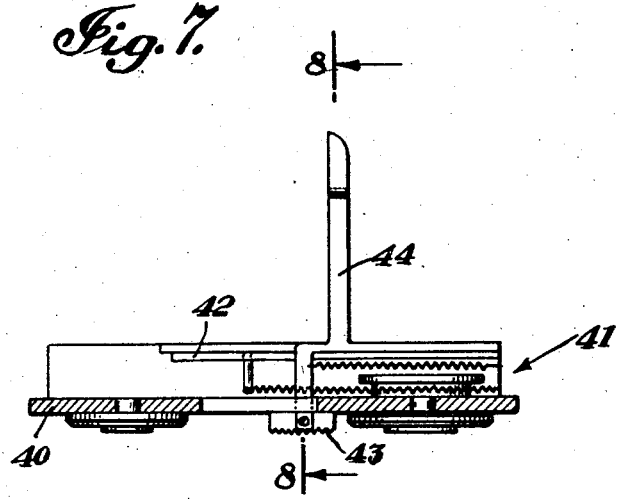
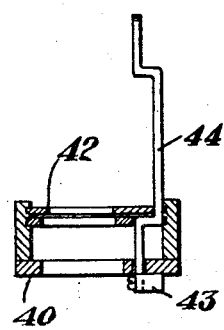
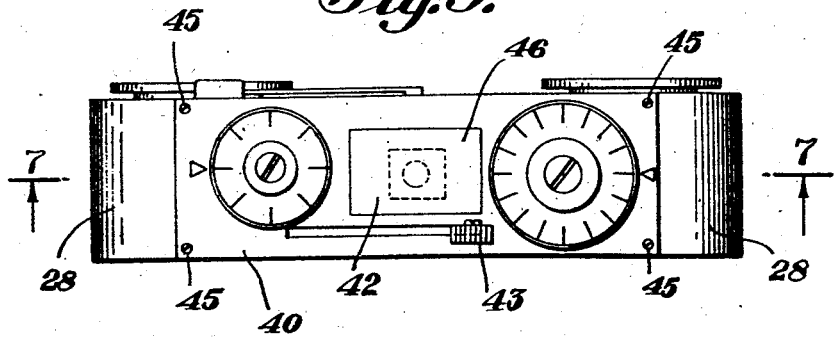
INVENTOR.
JACQUES BOLSEY
BY

INVENTOR.
JACQUES BOLSEY

Oct. 15, 1946.       J. BOLSEY       2,409,605
PHOTOGRAPHIC CAMERA
Filed Oct. 18, 1943       5 Sheets-Sheet 5

INVENTOR.
JACQUES BOLSEY
BY

Patented Oct. 15, 1946

2,409,605

UNITED STATES PATENT OFFICE 2,409,605

PHOTOGRAPHIC CAMERA

Jacques Bolsey, New York, N. Y.

Application October 18, 1943, Serial No. 506,699

6 Claims. (Cl. 95—31)

My present application is a continuation in part of my U. S. Patent No. 2,367,195, issued on January 16, 1945, and entitled "Photographic camera."

My present invention relates to photographic cameras and more particularly to photographic cameras for which perforated cinematographic film is used.

It is an object of my present invention to provide a photographic camera of extremely simple design which is nevertheless equipped with means necessary for accurate adjustment of all exposure factors.

A further object of my invention consists of a roll film camera of new design in which the film is arranged in a separate film magazine forming a unit with the camera body.

Still a further object of my invention consists in a new construction of the camera body of my new camera and also of the film magazine used for this camera.

Another object of my present invention consists in combining the film magazine with the camera body in such a manner as to use all available space within the camera body for useful purposes, thereby substantially reducing the size of the camera.

With the above objects in view, my present invention mainly consists of a photographic camera comprising a camera body, a camera lens and an exposure chamber being open at its rear end arranged within this camera body, and a plane aperture surface at the rear end of this camera body around the rear edge of the exposure chamber; this aperture surface is positioned in the focal plane of the camera lens normal to the optical axis of the same.

A removable film magazine of new type also forms part of my new photographic camera and is combined with the camera body in such a manner as to fit substantially into spaces within this camera body so as to use all available space within the same for useful purposes, thereby substantially reducing the size of the entire camera. This new film magazine comprises two film coil containers being spaced from each other; one of these containers houses the unexposed and the other the exposed film coil. These film coil containers are connected by a bridge-shaped film exposing member holding them spaced from each other; a pressure member, e. g. a pressure plate, is secured to and forms part of this film exposing member and is arranged in the space between the film coil containers and secured to the magazine, preferably to the bridge-shaped film exposing member, in such a manner as to press the film portion to be exposed and extending from one film coil container into the other against the aperture surface at the rear end of the camera body when the magazine is brought into operative picture-taking position with the film coil containers positioned on both sides of the camera body.

As noted above, not only the construction of the entire camera proposed by me is new, but also the single parts of this camera, as for instance the camera body, have an entirely new design. Thus, the camera body of my new camera consists of a central camera body housing the exposure chamber and sometimes also the camera lens, and is combined with a longitudinal front wall at the front end of the camera body; this front wall is exactly as high as the camera body but wider than the same, extending in direction of the width of the camera body over the side faces of the same, thus forming projecting wall portions at the front end of the camera body on both sides thereof; the end portions of these projecting wall portions are bent rearwards; a top and a bottom plate are secured to the top and bottom face of the camera body respectively, parallel to each other and extending from the front wall of the camera body and the rearward bent end portions of the same to at least the rear end of the camera body. Thus, these top and bottom plates form at both sides of the camera body compartments closed at their front ends by the front wall of the camera body, at the sides by the side faces of the camera body itself and by the rearwards bent end portions of the front wall and at the top and bottom by the top and bottom plates secured to the camera body; these compartments, however, are open at the rear, thus being adapted to house the film coil containers of a film magazine when the same is brought into operative picture taking position with these containers positioned on both sides of the camera body.

Preferably, the front wall and its rearwards bent end portions have the shape of two substantially semi-circular arc-shaped projections on opposite sides of the camera body arranged at and near the front end of the same and being open at the rear. The top and bottom plates completing the camera body are secured to the top and bottom faces of this body and extend from the above mentioned arc-shaped projections to at least the rear end of the camera body, thus forming substantially semi-cylindrical compartments adapted to house the cylindrical film coil containers of a film magazine.

I might provide on the outer face of the front wall of the camera body additional wall-like projections extending from the upper to the lower edge of the front wall parallel to each other and to the side walls of the camera body. These additional projections are arranged on the front wall at both sides of the camera body, forming together with this front wall an open channel-shaped space. The two plates forming the top and bottom of the camera body and being secured to the top and bottom faces of this body extend from the front edges of these additional wall-like projections to at least the rear end of the camera body, thus forming together with the front wall of the camera body and the additional wall-like projections on this front wall a compartment for the camera shutter mechanism. Simultaneously, these top and bottom plates form also the two compartments for the film coil containers of the film magazine.

As mentioned above, the camera body may contain a compartment for the exposure chamber and for the camera lens. However, it should be stressed that it is not necessary and not part of my present invention that the camera lens is arranged within the camera body and that it is also possible to arrange the camera lens and the mount therefor as a more or less separate unit on the front face of the camera body, for instance in front of the shutter mechanism.

I also wish to stress that usually the magazine will be housed by the compartments described above without any additional cover closing the rear of the camera body. However, if desired, it is also possible to provide such a separate cover and to enclose the entire film magazine into the camera.

The novel features which I consider characteristic of my invention are set forth in particular in the appended claims. The invention itself, however, both as to its construction and its method of operation, together with additional objects and advantages thereof, will be best understood from the following description of specific embodiments when read in connection with the accompanying drawings in which:

Figure 1 is a top view of my new camera body with the top plate shown in dotted lines;

Figure 2 is a side view of the camera body shown in Fig. 1;

Figure 3 is a front view of the same camera body;

Figure 4 is a rear view of the same camera body;

Figure 7 shows a cross section through the front wall of the shutter compartment together with the shutter mechanism along line 7—7 of Fig. 9;

Figure 8 shows a cross section of the front wall and shutter mechanism shown in Fig. 7, along line 8—8 of this figure;

Figure 9 shows a front view of the assembled camera;

Figure 5:
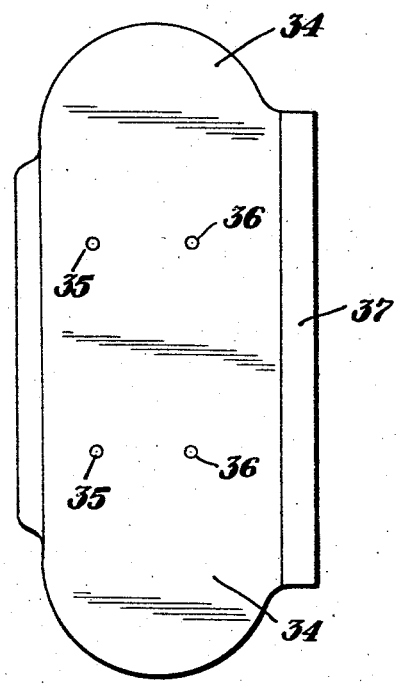
Figure 5 is a top view of one of the plates to be secured to and forming part of the camera body shown in Figs. 1 to 4.

An important part of my new camera is the camera body shown in Figs. 1 to 6. This camera body consists of a central body 20 containing the exposure chamber 21 and the camera lens 22. As clearly shown in Fig. 4, the camera body 20 has a rectangular cross section and is bounded by the two side faces 23 and 24, by the top face 25 and the bottom face 26. The front wall 27 of the camera body is wider than the camera body itself and extends in direction of the side faces 23 and 24 over the same, as shown in Fig. 1. The end portions 28 of this front wall 27 are bent rearwards, thus forming together with the side faces 23 and 24 of the camera body 20 and front wall 27 substantially semi-cylindrical compartments 29.

The camera body is furthermore provided with various recesses 30 and 31 serving for accommodating the diaphragm adjusting means and other mechanisms of the camera. Thus, through recess 30 a film transporting member 44, which will be described below more in detail, extends from the front face 32 of the camera body to its rear face 33 serving as exposure surface, engaging the film strip moving along this rear face.

Figure 6:
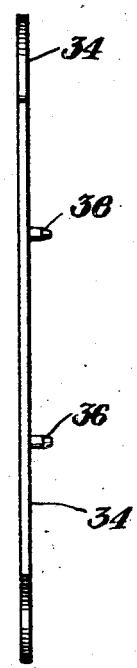
Figure 6 is a side view of the plate shown in Figure 5.

The top and bottom of my new camera are formed by the top and bottom plates 34 shown in Figs. 5 and 6. These plates are substantially larger than the top and bottom faces 25 and 26 of the camera body 20; thus, they project over the edges of these faces when they are secured to the same by screws 35 and locating pins 36.

Figure 14:
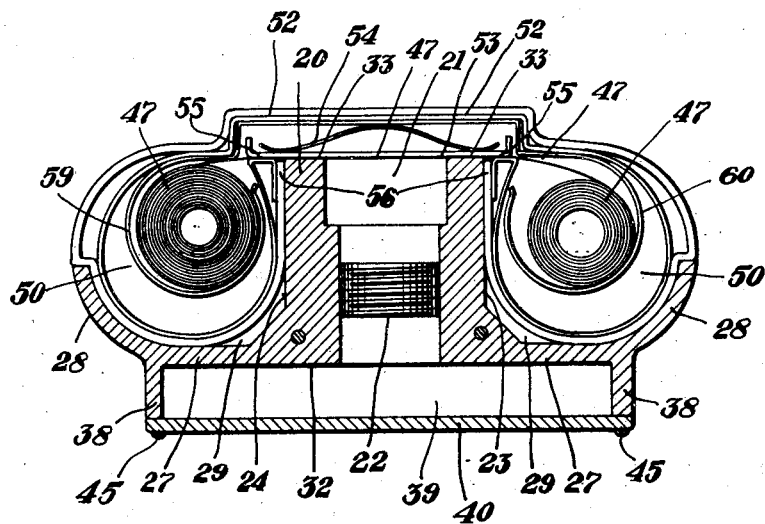
Figure 14 is a cross section through the assembled camera with the film magazine in operative picture-taking position but without the shutter mechanism.

In order to show clearly the relative position and relative size of the camera body itself and the cover plates 34, the top plate is shown also in Fig. 1 in dotted lines. As may be seen, this cover plate extends from front wall 27 and the rearwards projecting portions 28 of this wall to the rear face of the camera body 20, thereby forming the compartments 29 on both sides of the camera body 20, as shown in Fig. 14. These compartments 29 serve for housing the film coil containers of a film magazine.

Furthermore, the front portions 37 of the top and bottom walls 34 form together with front wall 27 of the camera body and the projecting wall portions 38 provided on this front wall a front compartment 39 for the shutter mechanism.

This front compartment 39 is covered by the compartment cover 40 which carries the entire shutter mechanism 41. Since this shutter mechanism itself does not form part of my present invention, it need not be described in detail. I only wish to mention that a plane shutter 42 operated by knob 43 forms part of this mechanism and that furthermore an operating member 44 is secured to this shutter passing through slot 31 in the camera body in such a manner as to engage the film moving along the rear aperture face 33 of this camera body. Thus, by removing the screws 45 securing the compartment cover 40 to the projecting wall portions 38 and the top and cover plates 34, it is possible to take off cover 40 together with the entire shutter mechanism for repair and like purposes, whenever required.

Fig. 9 is a front view of the assembled camera showing a rectangular opening 46 in cover 40 with the shutter 42 behind this opening. This figure also shows clearly the other knobs for operating the mechanism which determine the exposure factors; since these mechanisms for determining the exposure factors are not part of my present invention, they need not be described in detail.

As remarked above, the camera body 20 has a rear aperture face 33 serving as aperture surface and being arranged around the rear edge of the exposure chamber 21. This aperture scurface is located in the focal plane of the camera lens 22 normal to the optical axis thereof. It is evident that in order to attain sharpness of the picture, the film 47 must be in close contact with this aperture surface 33 during exposure, as shown in Fig. 14.

Figure 10:
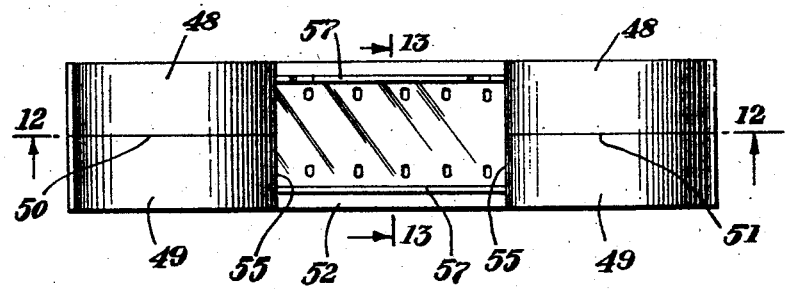
Figure 10 shows a front view of a film magazine used for the camera shown in Fig. 9.
Figure 11:
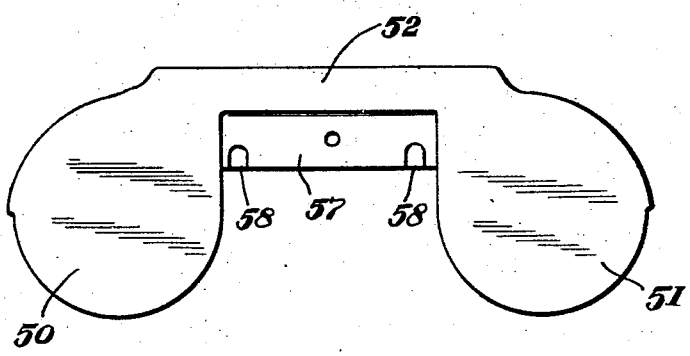
Figure 11 is a top view of the magazine shown in Fig. 10.
Figure 12:
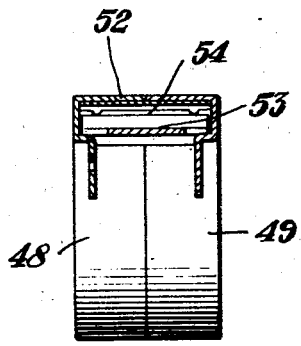
Figure 12 is a cross section of the magazine shown in Figs. 10 and 11, along line 13—13 of Fig. 10.

As explained above and shown in Fig. 1, the front and top plates 34 extend farther back than the aperture surface 33 in order to correspond in shape with the film magazine shown in Figs. 10 to 12 and to prevent light from reaching the film while it is in contact with and pressed against the aperture surface 33.

Figure 13:
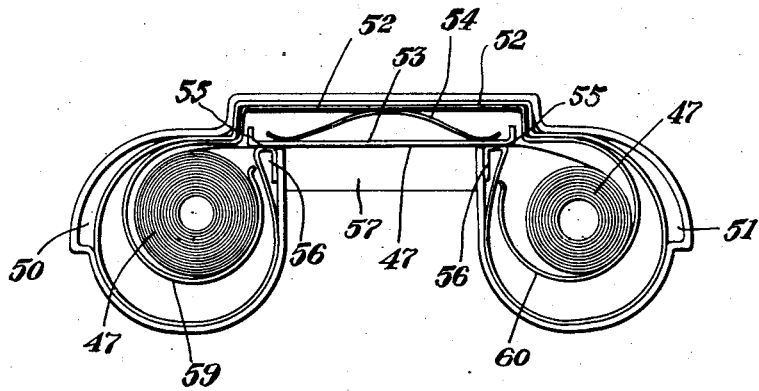
Figure 13 is a cross section of the same magazine along line 12—12 of Fig. 10.

As shown in Figs. 10 to 12, the film magazine consists of two magazine members 48 and 49 which, when assembled, form two film coil containers 50 and 51. These film coil containers 50 and 51 are connected by a channel or U-shaped bridge like member 52 arranged substantially in a plane tangential to the cylindrical surface of the film containers 50 and 51, as shown in Fig. 11. Within this channel shaped connecting member 52 a resilient pressure member is arranged; this pressure member consists of pressure plate 53 and leaf spring 54. Pressure plate 53 might be secured to spring 54, if required; the latter is secured to the inner bottom surface of the channel shaped member 42, thus holding pressure plate 53 at a certain distance from member 52 and enabling movement of this plate normal to the plane of member 52. As shown in Fig. 13, each of the cylindrical film coil containers 50 and 51 is provided with a slit shaped opening 55 for the film 47 passing from one container along pressure plate 53 into the other container. The pressure plate 53 is arranged in such a manner as to press against the projecting portions 56 of the film coil containers 50 and 51 and thus to close the slit shaped openings 55 when no film passes between these containers. This results in light-tight enclosure of the entire film when the film is coiled up in one container only.

It should also be mentioned that the slit shaped openings 55, connecting member 52 and pressure plate 53 are arranged in such a manner that light can never penetrate into the film coil containers 50 and 51; also if the film 47 passes through the slit shaped openings 55, the pressure plate 53 presses against this film in such a manner as to make entry of light into the containers impossible. This latter fact is especially important when a new film magazine has to be inserted into the camera in daylight.

The manner in which the film magazine is inserted into the camera is shown in Fig. 14; as may be seen in this figure, during operation of the camera the two film coil containers 50 and 51 are in the corresponding compartments 29 of the camera body 20; in this position, pressure plate 53 presses film 47 against the aperture surface 33 of the camera body 20, thus holding the film portion to be exposed at the required distance, namely, in the focal plane of the camera lens 22.

As shown in Figs. 10 to 12, the channel shaped connecting member 52 is also provided with small plates 57 fitting into corresponding slits of the central camera body 20; these small plates 57 serve as light traps, preventing light from reaching the film portion to be exposed between the film coil containers 50 and 51. In order to ensure proper inserting of the magazine into the camera body one of the plates 57 may be provided with cut-outs 58, co-operating with corresponding pins on the camera body; this arrangement prevents incorrect inserting of the magazine into the camera.

As shown in the drawings, no film spools or other means for winding up the film in the containers 50 and 51 are provided; the film transport is carried out by direct transport of the film portion sliding along pressure plate 53, with the aid of means described above in detail. However, I have found that it is hardly possible to form a film coil within a cylindrical container by simply pushing a film through a slit in this container and sliding its end along the inner container wall: after formation of a few coil windings which are naturally lying in contact with the inner container wall and pressing against it, friction between these windings themselves and between the outermost winding and the container wall will block further coiling up of the film. Therefore, I herewith propose to provide at least in the film coil container 50 into which the film 47 is wound up a helical spring 59 serving as guiding means for the film during its coiling up.

It should be noted that it is possible to provide also in the film coil container 51 a helical spring 60; this spring then serves for facilitating loading of the film container by pushing an unexposed film strip into the same through the slit shaped opening 55.

It will be understood that each of the elements described above, or two or more together, may also find a useful application in other types of photographic cameras differing from the types described above.

While I have illustrated and described the invention as embodied in photographic cameras using perforated cinematographic film and being combined with a separate film magazine, I do not intend to be limited to the details shown, since various modifications and structural changes may be made without departing in any way from the spirit of my invention.

Without further analysis, the foregoing will so fully reveal the gist of my invention that others can, by applying current knowledge, readily adapt it for various applications without omitting features that, from the standpoint of prior art, fairly constitute essential characteristics of the generic or specific aspects of this invention and therefore such adaptations should and are intended to be comprehended within the meaning and range of equivalence of the following claims.

What I claim as new and desire to secure by Letters Patent is:

1. In a photographic camera, a camera body, an exposure chamber within said camera body, a front wall arranged at the front end of said camera body and having the same height as but being wider than said camera body, thus forming at the front end of said camera body on both sides thereof projecting front wall portions, the ends of said projecting front wall portions being bent rearwards, additional wall-like projections on the outer face of said front wall extending parallel to each other and to the side walls of said camera body, said additional projections being arranged on said front wall at both sides of said camera body, having the same height as said camera body and forming together with said front wall an open channel shaped space, and a top and a bottom plate secured to the corresponding top and bottom faces respectively of said camera body, extending from the front edges of said additional wall-like projections at least to the rear end of said camera body, thus forming together with said front wall and said additional wall-like projections a frontal shutter compartment for the camera shutter mechanism and forming on the two sides of said camera body film compartments being closed at the sides, the top and the bottom but being open at the rear end and thus being adapted to house the film coil containers of a film magazine when the same is in operative picture taking position with said film coil containers positioned on both sides of said camera body.

2. In a photographic camera, a camera body, an exposure chamber within said camera body, a front wall arranged at the front end of said camera body and having the same height as but being wider than said camera body, thus forming at the front end of said camera body on both sides thereof projecting front wall portions, the ends of said projecting front wall portions being bent rearwards, additional wall-like projections on the outer face of said front wall extending parallel to each other and to the side walls of said camera body, said additional projections being arranged on said front wall at both sides of said camera body, having the same height as said camera body and forming together with said front wall an open channel shaped space, a top and a bottom plate secured to the corresponding top and bottom faces respectively of said camera body, extending from the front edges of said additional wall-like projections at least to the rear end of said camera body, thus forming together with said front wall and said additional wall-like projections a frontal shutter compartment for the camera shutter mechanism and forming on the two sides of said camera body film compartments being closed at the sides, the top and the bottom but being open at the rear end and thus being adapted to house the film coil containers of a film magazine when the same is in operative picture taking position with said film coil containers positioned on both sides of said camera body, a compartment cover plate being removably secured to the front edges of said additional wall-like projections and said top and bottom plates forming said frontal shutter compartment, said compartment cover plate thus closing said shutter compartment yet being removable whenever required, and a shutter mechanism being secured exclusively to said compartment cover plate so as to be adapted to be removed together with the same.

3. In a photographic camera, a camera body, an exposure chamber within said camera body, a front wall arranged at the front end of said camera body and having the same height as but being wider than said camera body, thus forming at the front end of said camera body on both sides thereof projecting front wall portions, the ends of said projecting front wall portions being bent rearwards, additional wall-like projections on the outer face of said front wall extending parallel to each other and to the side walls of said camera body, said additional projections being arranged on said front wall at both sides of said camera body, having the same height as said camera body and forming together with said front wall an open channel shaped space, a top and a bottom plate secured to the corresponding top and bottom faces respectively of said camera body, extending from the front edges of said additional wall-like projections at least to the rear end of said camera body, thus forming together with said front wall and said additional wall-like projections a frontal shutter compartment for the camera shutter mechanism and forming on the two sides of said camera body film compartments being closed at the sides, the top and the bottom but being open at the rear end and thus being adapted to house the film coil containers of a film magazine when the same is in operative picture taking position with said film coil containers positioned on both sides of said camera body, a compartment cover plate being removably secured to the front edges of said additional wall-like projections and said top and bottom plates forming said frontal shutter compartment, said compartment cover plate thus closing said shutter compartment yet being removable whenever required, a shutter mechanism secured exclusively to said compartment cover plate, and a film transporting mechanism being connected to said cover plate and constructed in such a manner as to reach through a corresponding opening in said camera body to the rear face thereof, thus said shutter mechanism and said film transporting mechanism being removable from said camera body together with said compartment cover plate whenever required.

4. In a photographic camera, a camera body, an exposure chamber arranged within said camera body, a front wall arranged at the front end of said camera body and thus forming at the front end of said camera body on both sides thereof projecting front wall portions, the ends of said projecting front wall portions being bent rearwards, additional wall-like projections on the outer face of said front wall extending parallel to each other and to the side walls of said camera body, said additional projections being arranged on said front wall at both sides of said camera body forming together with said front wall an open channel shaped space, and a top and a bottom plate secured to the corresponding top and bottom faces respectively of said camera body, extending from the front edges of said additional wall-like projections at least to the rear end of said camera body, thus forming together with said front wall and said additional wall-like projections a frontal shutter compartment for the camera shutter mechanism and forming on the two sides of said camera body film compartments being closed at the sides, the top and the bottom but being open at the rear end and thus being adapted to house the film coil containers of a film magazine when the same is in operative picture taking position with said film coil containers positioned on both sides of said camera body.

5. In a photographic camera, a camera body, an exposure chamber within said camera body, a front wall at the front end of said camera body, projecting wall portions on both sides of said camera body, the ends of said projecting wall portions being bent rearwards, additional wall-like projections on the outer face of said front wall arranged at both sides of said camera body, and a top and a bottom plate secured to the corresponding top and bottom faces respectively of said camera body, extending from the front edges of said additional projections at least to the rear end of said camera body, thus forming together with said front wall and said additional projections a frontal shutter compartment for the camera shutter mechanism and forming on the two sides of said camera body film compartments being closed at the sides, the top and the bottom but being open at the rear end and thus being adapted to house the film coil containers of a film magazine when the same is in operative picture taking position with said film coil containers positioned on both sides of said camera body.

6. In a photographic camera, a camera body, an exposure chamber within said camera body, a front wall at the front end of said camera body, projecting front wall portions on both sides of said camera body, the ends of said projecting front wall portions being bent rearwards, projecting top and bottom wall portions on both sides of said camera body covering the space formed by said projecting front wall portions, thus forming on both sides of said camera body film compartments being closed at the sides, the top and the bottom but open at the rear end, compartment walls along the edges of said front wall arranged normal to the same and forming an open relatively flat compartment in front of said front wall, a compartment front plate removably secured to the front edges of said compartment walls closing said compartment, and a shutter operating mechanism secured to said compartment front plate so as to be adapted to be removed together with the same whenever required.

JACQUES BOLSEY.